United States Patent
Woodruff et al.

(10) Patent No.: US 12,526,486 B1
(45) Date of Patent: *Jan. 13, 2026

(54) VIDEO ENCODER NETWORK SANDBOXING

(71) Applicant: Amazon Technologies, Inc., Seattle, WA (US)

(72) Inventors: Eric Woodruff, Beaverton, OR (US); Akshat Aranya, Portland, OR (US); Varad Joshi, Portland, OR (US); Rebecca Claire Weiss, Vienna, VA (US)

(73) Assignee: Amazon Technologies, Inc., Seattle, WA (US)

( * ) Notice: Subject to any disclaimer, the term of this patent is extended or adjusted under 35 U.S.C. 154(b) by 98 days.

This patent is subject to a terminal disclaimer.

(21) Appl. No.: 17/483,015

(22) Filed: Sep. 23, 2021

Related U.S. Application Data

(63) Continuation of application No. 15/619,001, filed on Jun. 9, 2017, now Pat. No. 11,140,455.

(51) Int. Cl.
*H04L 29/06* (2006.01)
*H04N 21/2187* (2011.01)
(Continued)

(52) U.S. Cl.
CPC ..... *H04N 21/6334* (2013.01); *H04N 21/2187* (2013.01); *H04N 21/236* (2013.01);
(Continued)

(58) Field of Classification Search
CPC . H04L 63/0209; H04L 63/0272; H04L 63/20; H04N 21/6334; H04N 21/2187; H04N 21/236; H04N 21/2387; H04N 21/266; H04N 21/4147; H04N 21/4334; H04N 21/64322
See application file for complete search history.

(56) References Cited

U.S. PATENT DOCUMENTS

| | | |
|---|---|---|
| 4,625,081 A | 11/1986 | Lotito et al. |
| 7,805,706 B1 | 9/2010 | Ly et al. |

(Continued)

FOREIGN PATENT DOCUMENTS

WO    2014047073 A1    3/2014

OTHER PUBLICATIONS

Dang, "Recommendation for Applications Using Approved Hash Algorithms," NIST Special Publication 800-107, Revision 1, Aug. 2012, 25 pages.

(Continued)

*Primary Examiner* — Joseph P Hirl
*Assistant Examiner* — Chi D Nguy
(74) *Attorney, Agent, or Firm* — Davis Wright Tremaine LLP

(57) ABSTRACT

A first network namespace and second network namespace are created in a computing instance of a computer system, with the second network namespace being accessible to the first network namespace via an interface. A service is executed in the first namespace and an encoder is executed in the second namespace, with the encoder transforming media from one format to another format. Communication from the encoder to the service is regulated via the interface.

20 Claims, 8 Drawing Sheets

(51) Int. Cl.
| | |
|---|---|
| *H04N 21/236* | (2011.01) |
| *H04N 21/2387* | (2011.01) |
| *H04N 21/266* | (2011.01) |
| *H04N 21/4147* | (2011.01) |
| *H04N 21/433* | (2011.01) |
| *H04N 21/6334* | (2011.01) |
| *H04N 21/643* | (2011.01) |

(52) U.S. Cl.
CPC ....... *H04N 21/2387* (2013.01); *H04N 21/266* (2013.01); *H04N 21/4147* (2013.01); *H04N 21/4334* (2013.01); *H04N 21/64322* (2013.01)

(56) References Cited

U.S. PATENT DOCUMENTS

| | | | |
|---|---|---|---|
| 8,214,653 | B1 | 7/2012 | Marr et al. |
| 8,484,353 | B1 | 7/2013 | Johnson et al. |
| 8,621,069 | B1 | 12/2013 | Tompkins |
| 8,788,855 | B2 | 7/2014 | Cong et al. |
| 9,064,124 | B1 | 6/2015 | Davis et al. |
| 9,203,613 | B2 | 12/2015 | Roth et al. |
| 9,256,467 | B1 | 2/2016 | Singh et al. |
| 9,405,569 | B2 | 8/2016 | Greden et al. |
| 9,769,120 | B2 | 9/2017 | Fainkichen et al. |
| 2004/0040025 | A1 | 2/2004 | Lehtinen |
| 2004/0064521 | A1* | 4/2004 | Baudry ............... G06F 9/544 709/213 |
| 2006/0136928 | A1 | 6/2006 | Crawford et al. |
| 2006/0168575 | A1 | 7/2006 | Bhatt et al. |
| 2006/0168581 | A1 | 7/2006 | Goger et al. |
| 2007/0118657 | A1 | 5/2007 | Kreitzer et al. |
| 2007/0245331 | A1 | 10/2007 | Daynes et al. |
| 2008/0244611 | A1 | 10/2008 | Doyle et al. |
| 2008/0301256 | A1* | 12/2008 | McWilliams ....... G06F 12/0806 714/E11.178 |
| 2010/0153941 | A1 | 6/2010 | Borissov et al. |
| 2011/0082892 | A1* | 4/2011 | Ogasawara ......... G06F 12/1475 707/819 |
| 2012/0166644 | A1 | 6/2012 | Liu et al. |
| 2013/0007088 | A1 | 1/2013 | Alfredo et al. |
| 2013/0191527 | A1 | 7/2013 | Ashok et al. |
| 2013/0297964 | A1 | 11/2013 | Hegdal et al. |
| 2014/0115330 | A1 | 4/2014 | Chen et al. |
| 2014/0149986 | A1 | 5/2014 | S M et al. |
| 2015/0010151 | A1 | 1/2015 | Roelse |
| 2015/0082378 | A1* | 3/2015 | Collison ................ H04L 63/20 726/1 |
| 2015/0127805 | A1 | 5/2015 | Htay et al. |
| 2015/0242197 | A1 | 8/2015 | Alfonso et al. |
| 2015/0264014 | A1 | 9/2015 | Budhani et al. |
| 2016/0217700 | A1 | 7/2016 | Zimmer et al. |
| 2016/0378545 | A1* | 12/2016 | Ho ...................... G06F 11/302 718/107 |
| 2017/0024100 | A1 | 1/2017 | Pieper et al. |
| 2017/0041288 | A1* | 2/2017 | Stotski ................ G06F 9/5077 |
| 2017/0222815 | A1 | 8/2017 | Meriac et al. |
| 2018/0062952 | A1* | 3/2018 | Sherkhonov ........... H04L 43/04 |
| 2018/0063087 | A1 | 3/2018 | Hira et al. |
| 2018/0077437 | A1 | 3/2018 | Hansen et al. |
| 2018/0198824 | A1* | 7/2018 | Pulapaka ............ H04L 41/5025 |

OTHER PUBLICATIONS

He, et al., "Elastic Application Container: A Lightweight Approach for Cloud Resource Provisioning, 26th IEEE International Conference on Advanced Information Networking and Applications," Mar. 26, 2012, 8 pages.

International Search Report and Written Opinion mailed Jan. 27, 2016, for International Application No. PCT/US2015/059983, filed Nov. 10, 2015, 9 pages.

Pikkarainen, et al., "The Impact of Agile Practices on Communication in Software Development," Empirical Software Engineering 13(3):303-337, 2008, 35 pages.

Ramaritham, K., "Allocation and Scheduling of Precedence-Related Periodic Tasks," IEEE Transactions on Parallel and Distributed Systems 6(4):412-420, Apr. 1995, 9 pages.

Soltesz, et al., "Container-Based Operating System Virtualization: A Scalable, High-Performance Alternative to Hypervisors," Proceedings of the Second ACM SIGOPS/EuroSys European Conference on Computer Systems, Mar. 21-23, 2007, Lisbon, ACM SIGOPS Operating Systems Review41{3}:275-287, 13 pages.

Thiele, et al., "Embedded Software in Network Processors—Models and Algorithms," Lecture Noles in Computer Science, vol. 2211, pp. 416-434, 2001, 19 pages.

U.S. Appl. No. 14/951,334, filed Nov. 24, 2015, titled "Container Telemetry".

Van, et al., "SLA-Aware Virtual Resource Management for Cloud Infrastructures, " IEEE Ninth International Conference on Computer and Information Technology, Oct. 11, 2009, pp. 357-362, 6 pages.

Xavier, et al., "Performance Evaluation of Container-Based Virtualization for High Performance Computing Environments," 2013 21st Euromicro International Conference on Parallel, Distributed, and Network-Based Processing, Belfast, Feb. 2013, pp. 233-240, 8 pages.

Zhao, M., et al., "Experimental Study of Virtual Machine Migration in Support of Reservation of Cluster Resources," Proceedings of the 2nd International Workshop on Virtualization Technology in Distributed Computing, Reno, Nevada, Nov. 12, 2007, pp. 1-8, 8 pages.

* cited by examiner

Subnetting Successful

Major Network: 10.0.0.0/16
Available IP addresses in major network: 65534
Number of IP addresses needed: 4000
Available IP addresses in allocated subnets: 4094
About 63% of available major network address space is used
About 98% of subnetted network address space is used

| Subnet Name | Needed Size | Allocated Size | Address | Mask | Dec Mask | Assignable Range | Broadcast |
|---|---|---|---|---|---|---|---|
| control0 | 4000 | 4094 | 10.0.0.0 | /20 | 255.255.240.0 | 10.0.0.1 – 10.0.15.254 | 10.0.15.255 |
| public0 | 4000 | 4094 | 10.0.80.0 | /20 | 255.255.240.0 | 10.0.80.1 – 10.0.95.254 | 10.0.95.255 |
| control1 | 4000 | 4094 | 10.0.16.0 | /20 | 255.255.240.0 | 10.0.16.1 – 10.0.31.254 | 10.0.31.255 |
| public1 | 4000 | 4094 | 10.0.96.0 | /20 | 255.255.240.0 | 10.0.96.1 – 10.0.111.254 | 10.0.111.255 |
| control2 | 4000 | 4094 | 10.0.32.0 | /20 | 255.255.240.0 | 10.0.32.1 – 10.0.47.254 | 10.0.47.255 |
| public2 | 4000 | 4094 | 10.0.112.0 | /20 | 255.255.240.0 | 10.0.112.1 – 10.0.127.254 | 10.0.127.255 |
| control3 | 4000 | 4094 | 10.0.48.0 | /20 | 255.255.240.0 | 10.0.48.1 – 10.0.63.254 | 10.0.63.255 |
| public3 | 4000 | 4094 | 10.0.128.0 | /20 | 255.255.240.0 | 10.0.128.1 – 10.0.143.254 | 10.0.143.255 |
| control4 | 4000 | 4094 | 10.0.64.0 | /20 | 255.255.240.0 | 10.0.64.1 – 10.0.79.254 | 10.0.79.255 |
| public4 | 4000 | 4094 | 10.0.144.0 | /20 | 255.255.240.0 | 10.0.144.1 – 10.0.159.254 | 10.0.159.255 |

There is one subnet pair per Availability Zone for up to 5 Availability Zones in a region

FIG. 3

VIDEO ENCODER NETWORK SANDBOXING

CROSS-REFERENCE TO RELATED APPLICATION

This application is a continuation of U.S. patent application Ser. No. 15/619,001, filed Jun. 9, 2017, entitled "VIDEO ENCODER NETWORK SANDBOXING," the disclosure of which is incorporated herein by reference in its entirety.

BACKGROUND

Digital content providers provide access to customers and other users to record and playback live streams of digital content. In many cases, such digital content is streamed to or from a customer's or user's own computing device. However, live streaming video encoding often requires a unique Internet Protocol address as a destination, which creates a security concern of how to protect the encoder processing the video stream within the infrastructure from a potential data injection attack. Furthermore, the process of encoding the video often has different networking requirements from the configuration and monitoring of running encoders, which can create conflicting requirements on the same networking stack.

BRIEF DESCRIPTION OF THE DRAWINGS

Various techniques will be described with reference to the drawings, in which:

FIG. 3 illustrates an example of subnetworks in accordance with an embodiment;

DETAILED DESCRIPTION

Techniques and systems described below relate to using split network architecture to sandbox components of a streaming media encoding service. In one example, a host computing device hosts a computing instance (physical or virtual) that operates a first network is created to have a first namespace and a second network is created to have a second namespace different from the first namespace. In the example, the first namespace includes a first software container that executes a management service that manages a media encoder and is associated with a first identifier (e.g., an Internet Protocol address, domain name, etc.). Also in the example, the second namespace includes a second software container that executes the media encoder and is associated with a second such identifier. The first network is communicatively coupled to the second network via a pair of virtual network interfaces that limit access to the management service from the second namespace. In some examples, an authorization metadata emulating service is executed in the first namespace and a media encoder is executed in the second namespace. In some of these examples, the authorization metadata emulating service receives requests from the media encoder via the pair of virtual network interfaces.

In the preceding and following descriptions, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Techniques described and suggested in the present disclosure improve the field of computing, specifically the field of live media encoding, by controlling access to resources by unauthorized entities by separating running programs of a media encoder service into different network environments. Additionally, techniques described and suggested in the present disclosure improve the security of media encoder systems by isolating privileged management services from potential code injection attacks. Moreover, techniques described and suggested in the present disclosure are necessarily rooted in computer technology in order to overcome problems specifically arising with media encoding in a distributed computing system by segregating the components that perform the actual media encoding from the services that manage the encoding components.

Figure 1:
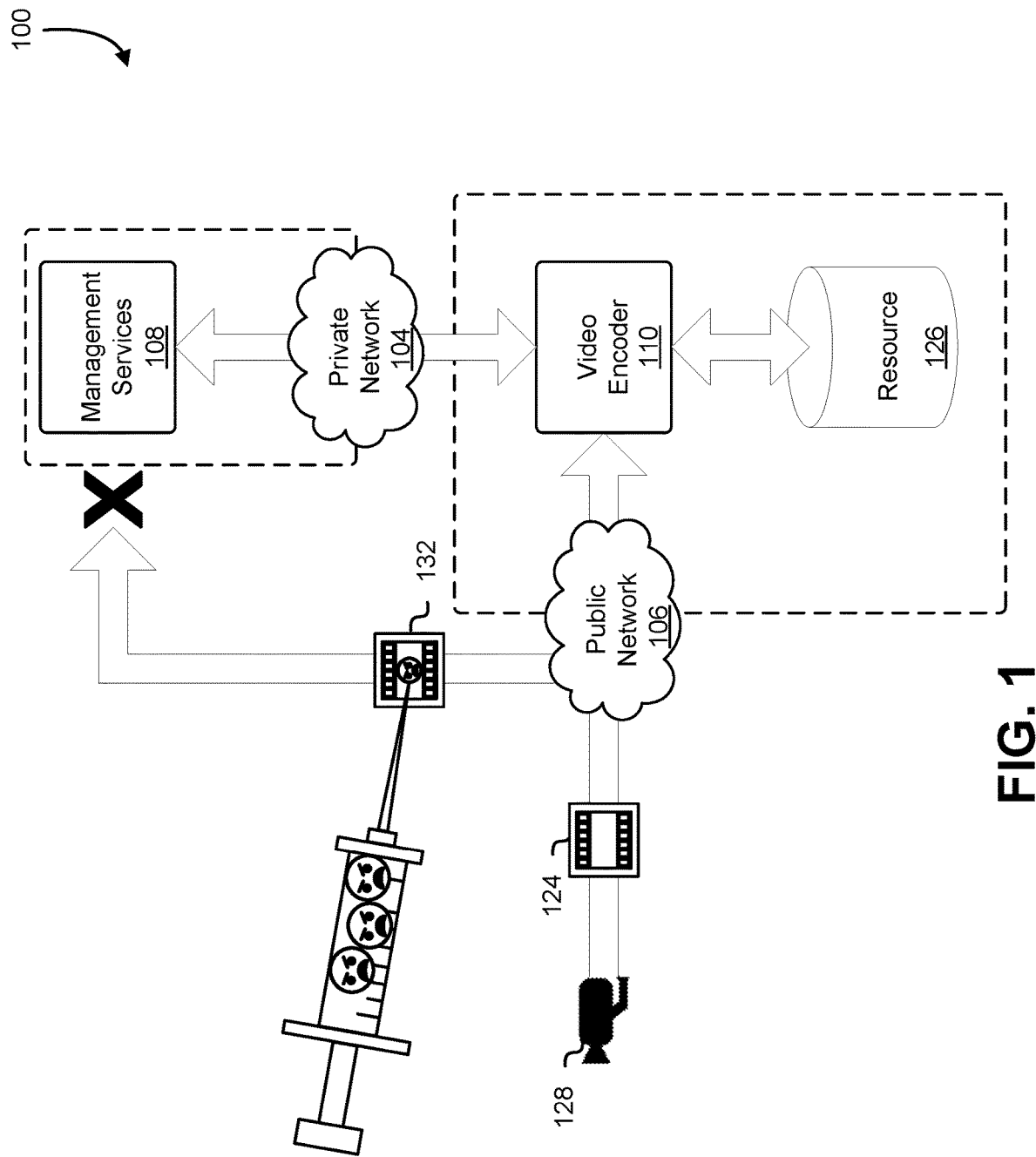
FIG. 1 illustrates an example of video encoder network sandboxing in accordance with an embodiment.

FIG. 1 illustrates an environment 100 of a video encoder service of an embodiment of the present disclosure. As illustrated in FIG. 1, the environment 100 may include a public network 106 for receiving a video content stream 124 from a recording device 128 via a public network 106 to video encoder 110. Management services 108 for the video encoder 110 and related services may be isolated from access by the public by the implementation of a private network 104. The purpose of separating the management services 108 into the private network 104 is to protect the management services 108 from potential malicious code injection 132 in the video content stream 124.

In some embodiments, the present disclosure refers to sandboxing the components of a video stream encoder service. However, it is contemplated that the video streams may also include audio that will also be encoded. Furthermore, it is contemplated that embodiments of the present disclosure can be adapted to any media or multimedia encoding or decoding system. For example, embodiments of the present disclosure can be used for purely audio stream encoding. In some examples, "sandboxing" may refer to controlling access to resources by unauthorized entities by separating running programs of an application group into different network environments.

In one embodiment, various components of the video encoder service execute in a software container service, such as the software container service described in U.S. Pat. No. 9,256,467, filed on Nov. 11, 2014, entitled "SYSTEM FOR MANAGING AND SCHEDULING CONTAINERS," the content of which is incorporated by reference herein in its entirety. In the present disclosure, a "software container" (also referred to as a "container" for brevity) may be an isolated user space instance. That is, in some embodiments a software container is a lightweight, virtualized instance running under a computer system instance that includes programs, data, and system libraries. Therefore, in some embodiments, a software container engine may simply abstract an operating system kernel, in contrast to a virtual machine which abstracts an entire hardware device. Furthermore, in some embodiments, although software containers run in isolation from each other, the software containers may share the same binaries and library files as needed.

When a software container is run, the running program (i.e., the process) may be isolated from other processes running in the same computer system instance. Thus, multiple software containers may each run under an operating system (e.g., using memory, CPU, and storage allocated by the operating system) of a container instance and execute in isolation from each other (e.g., each container may have an isolated view of the file system of the operating system). Each of the containers may have its own process namespace, and applications running within the containers may be isolated by only having access to resources available to the container process namespace.

The process namespace may be associated with process identifiers (PID) associated with running processes. Thus a PID namespace may provide isolation for the PID-allocated processes running in the namespace. Another type of namespace referred to in the present disclosure is a network namespace. In some embodiments, a network namespace isolates physical or virtual network interface controllers, firewall rules, routing tables, and so on. In some implementations, network namespaces may be communicatively coupled to each other using a "veth" virtual Ethernet device.

A system that manages software containers may be referred to in the present disclosure as a software container engine. In the present disclosure, a software container service may be a software container engine that executes as a service. However, it is contemplated that a standalone software container engine (e.g., the Docker container engine, the CoreOS Rocket container engine, etc.) can be configured to perform the techniques described in the present disclosure.

Software containers may be launched to have only specified resources from resources allocated to the container instance under which the software container is running; that is, a task definition may specify that a software container only utilize a specified amount of memory and/or a specified amount of processing power. In some examples, a "task definition" refers to parameters specifying a set of containers (i.e., a set of containers that, when running on a host computing system, are associated with each other) that are to start as a group. The task definition may be written in any suitable format, including JavaScript Object Notation (JSON), Extensible Markup Language (XML), or some other format. The task definition may further specify disk and network locations that the software containers are able to share on a single physical machine. Thus, the task definition may be utilized for launching the set of software containers. A task definition file may specify multiple tasks for respective software containers. In some examples, a "task" refers to a process specified in the task definition to be performed by a software container.

The various components of the video encoder service may be defined by one or more tasks in a task definition. Examples of management components include components for managing the health and failures of the video encoder 110, components for providing metrics about the video encoder to a telemetry service, and the video encoder 110 itself. All of these components may be running as a logical task.

In some embodiments of the video encoder service, the video encoder 110 has a port and a stable Internet Protocol (IP) address as a destination for the video content stream 124. The video content stream may be uploaded from the recording device 128 to the video encoder 110, whereupon the video encoder 110 transforms the video content stream 124 into encoded video output, which may be stored with the resource 126 (e.g., a data store), output through the public network 106 to a client device (e.g., viewing device such as a smart phone laptop computer, tablet computer, etc.) or output to some other resource. In embodiments, the video content stream 124 is streamed using a transport layer protocol, such as user datagram protocol (UDP), transmission control protocol (TCP), or other such transport layer protocol. In such embodiments, the video content stream 124 is sent to the video encoder 110 at a particular IP address and a port of the encoder service, where the IP address and port are fixed for at least the duration of the upload.

As noted above, in order to protect the management services 108 from a malicious code injection 132 in the video content stream 124 that might be caused to run with privileged access, embodiments of the present disclosure segregate the management services 108 using the private network 104 thereby preventing the management services 108 from being directly accessible via the public network 106. In some embodiments, the video encoder stores encoded video output in a data store, as represented in FIG. 1 by the resource 126, made accessible to the video encoder 110 by the customer of the computing resource service provider hosting the video encoder service. That is, the resource 126 may be provided by the computing resource service provider as a storage service to the customer for use of storing media content. Note that the resource 126 may represent one or more services such as one or more of a streaming service, an archival data storage service, a block-level storage service, or some other service.

In some embodiments, the management services 108 and the video encoder 110 are executed on the same host computing device. However, to solve problems with competing requirements (e.g., different networking and security requirements and privileges), FIG. 1 illustrates separate logical networks as separate network namespaces for separating the management services from the live encoding services. As noted above, services may be distributed according to the public network 106 and the private network 104, with the end result of being two isolated contexts of execution: a service management context and a user context. The private network 104 reflects the service management context. Management and monitoring of the video encoder 110 in the service management context may involve accessing various services in the distributed computing system of the computing resource service provider and may have different network requirements (e.g., default network route, domain name servers (DNS), security authorization, etc.) than the components that actually perform the video encoding. The management services 108 may include management and monitoring services, such as authentication and authorization services, telemetry metrics monitoring services, logging services, and services that access other services of the computing resource service provider (e.g., cryptography services, key management services, policy management services, etc.).

The public network 106 may reflect the user context. For the user context, a virtual network interface may be created for the publicly accessible components, such as the video encoder 110, to hold the virtual IP address. The virtual network interface may be attached to the video encoder 110 at the video encoder startup. The virtual network interfaces that are associated with video content stream 124 are moved into the user network context, and consequently are separated from a host virtual machine instance and/or logical network that the management service containers are executing in. This allows IP addresses to be assigned to the virtual network interfaces via Dynamic Host Configuration Protocol (DHCP). In some examples, "interface" refers to an addressable device, comprising hardware, firmware, software, or combination thereof, for communicatively coupling an entity (such as a router, server, switch, soft-switch, gateway, etc.) to a network. The entity may have multiple interfaces, each of which may be addressable via one or more networks.

In embodiments, the described networks may represent a path of communication between components of a physical and/or virtual network. In some examples, the network may be a packet switched network, such as an Internet Protocol switched network. Examples of networks include the Internet, a local area network (LAN), a wide area network (WAN), and Wi-Fi. The IP addresses could be in the user's virtual private cloud space, which may permit the video encoder to operate and access IP addresses and hostnames for various resources, such as a digital rights management (DRM) server or other output destination private to the user while still allowing the video encoder to interact with the management services.

The client recording device 128 may be a recording device for recording an event to be streamed via a media content service. A recording device may be a machine or device that is designed to record and/or communicate a digital or analog stream of media, such as audio, video, text, or any combination of audio, video, or text, in a manner such that the media can be replayed or reproduced on a device designed to display such media. Examples of such recording devices include a digital video camera, a microphone in a mobile telephone, a web camera, and so on.

The video content stream may be streamed from media content service to an end-user, such as a viewer of a live event being recorded and streamed. In some examples, "streaming" can refer to a process of delivering media content in a manner such that the media content is being received and processed by an entity while the content is being delivered by the source of the content, as opposed to "downloading" in which the entity obtains the entire file before processing the data within the file. With streaming media, the data may begin to be processed before the entire data file has been transmitted.

The malicious code injection 132 may be invalid data or executable code injected in the video content stream 124 that can potentially cause data loss, data corruption, denial of access, or unauthorized manipulation of one or more services or host computing devices. Because the management services 108 may execute with elevated privileges and may have access to multiple users' data, the consequences of the malicious code injection 132 could be severe.

Live streaming video encoding may utilize a unique IP address as a destination, rather than a path-based web server. This IP address may provide direct access to the video encoder 110 worker instance. However, in order to protect the management services 108 that are running with elevated permissions from potential security threat from the malicious code injection 132 in the video content stream 124, the management services 108 are isolated in the private network 104. The components of the video encoder service, such as the video encoder 110, are then managed through the private network 104 by the management services 108.

In some implementations, the customer can require the video encoder 110 input and output to route through a virtual private cloud of the customer. Likewise, the customer may require the video encoder 110 to access a digital rights management (DRM) key server and/or access a storage resource, such as a data store represented by the resource 126, under a delegated authorization profile.

Figure 2:
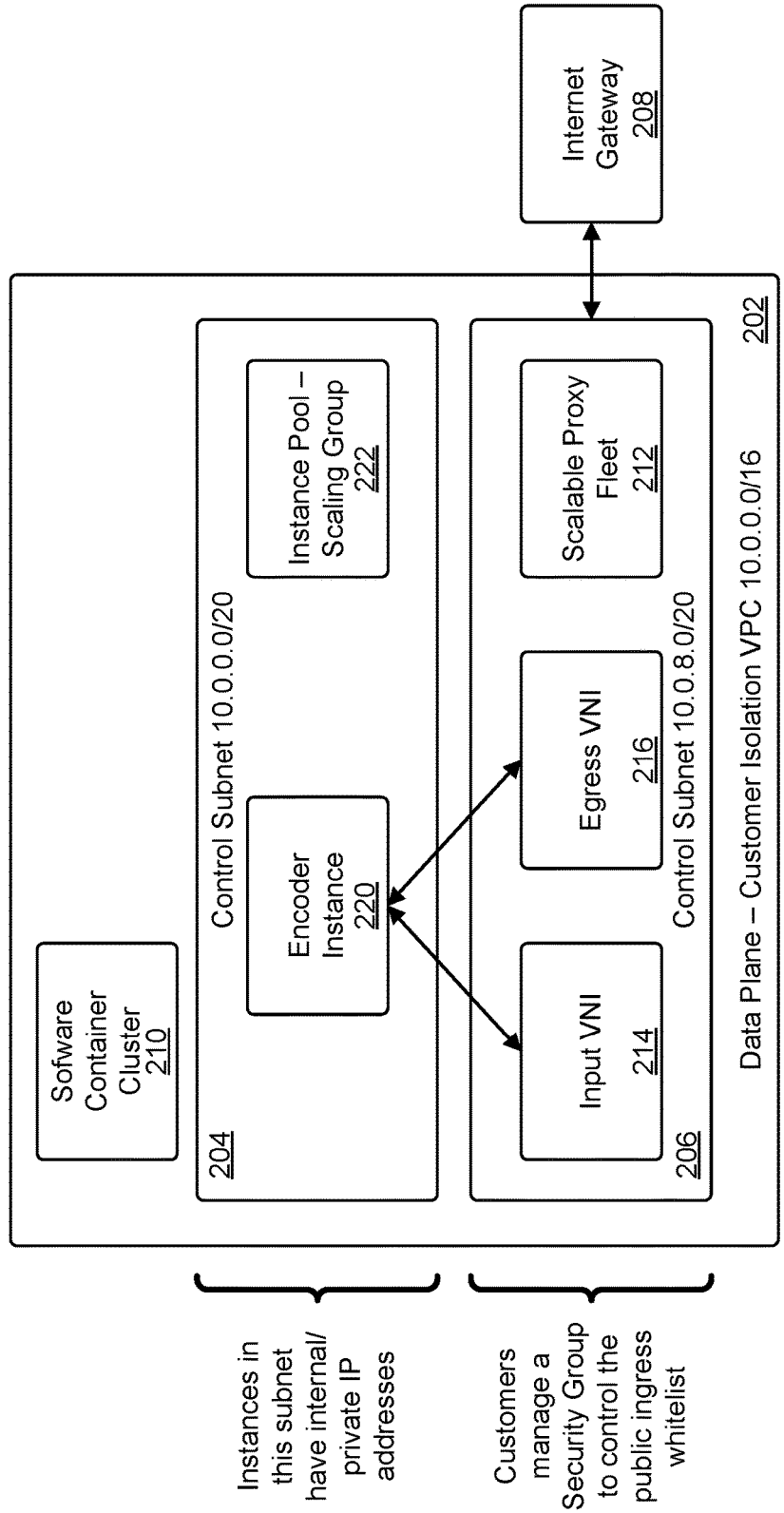
FIG. 2 illustrates an example of user shadow virtual private cloud subnetworks in accordance with an embodiment.

FIG. 2 illustrates user shadow virtual private cloud subnetworks 200 of an embodiment of the present disclosure. As illustrated in FIG. 2, the user shadow virtual private cloud subnetworks 200 may include a data plane 202, which may be a virtual private cloud for a specific customer of a computing resource service provider. The data plane 202 in the user shadow virtual private cloud subnetworks 200 is shown, Classless Inter-Domain Routing (CIDR) notation, to have the IPv4 block of 10.0.0.0/16. In some embodiments, a virtual private cloud (VPC) refers to a group of shared computing resources in a distributed computing environment hosted by a computing resource service provider, whereby a VPC of one user is isolated from VPCs and other computing environments associated with other users. Note, however, in some embodiments, the data plane 202 is shared such that the data plane 202 can be used for managing resources of multiple customers of the computing resource service provider.

The data plane may include a software container cluster 210. The data plane 202 is divided into two control subnets, private subnetwork 204 and public subnetwork 206, having IPv4 blocks of 10.0.0.0/20 and 10.0.8.0/20 respectively. Components of the public subnetwork 206 may have IP addresses accessible through an Internet gateway 208. Components of the public subnetwork 206 may include an input network interface 214, and egress network interface 216, and a scalable proxy fleet 212. The private subnetwork 204, in contrast, may not be directly accessible by entities external to the data plane 202, and may include an encoder instance 220 and an instance pool scaling group 222.

The components of the data plane 202 may be stateless such that a replacement component need not have information about the component that it is replacing. Each container component in the data plane 202 may be configured to only perform one process. The data plane 202 may manage resources such as a user shadow VPC, security groups or network access control lists, software container clusters, virtual network interfaces and virtual Internet Protocol addresses, virtual machine instances and auto-scaling groups, software container engine task definitions, telemetry service events, and other such resources and services. In embodiments, each software container instance executing in the data plane 202 executes one task/process. In some embodiments, sidecar containers within the software container engine task perform additional tasks/processes. For example, a metrics and logging sidecar container may be configured to access application programming interfaces to other services of the computing resource service provider (e.g., telemetry service) from their respective namespace.

The user shadow virtual private cloud subnetworks 200 illustrates a VPC associated with the customer that contains the resources created for the customer for media encoding. The user shadow virtual private cloud subnetworks 200 may be isolated and separate for each customer. Within the user shadow virtual private cloud subnetworks 200 is a public subnetwork 206 that allows Internet routing through the Internet gateway 208. The virtual network interfaces, including the input network interface 214 and the egress network interface 216, are located in the public subnetwork 206 so that they can be assigned virtual IP addresses and attached to the encoder instance 220.

The Internet gateway 208 may be hardware or software that interfaces between the Internet and the public subnetwork 206. As noted above, the public subnetwork 206, like the private subnetwork 204, may be a logical division of the data plane 202. The public subnetwork 206 may be publicly accessible in the sense that components of the public subnetwork 206 may have IP addresses that are publicly accessible through the Internet gateway 208. The customers may control access to the virtual network interfaces using security groups (e.g., creating whitelist of authorized users or other authorized entities).

The scalable proxy fleet 212 may be a distributed system of proxy servers running a computer platform that can be scaled up or down (e.g., servers can be added or removed from the fleet) as needed according to processing demand. The proxy servers of the scalable proxy fleet 212 may be virtual machines or may be servers that direct user traffic to the proper software container. In some examples, the term "virtual machine" refers to an emulation, in software and/or hardware of a physical computer system, such that software executing in the virtual machine environment behaves as if the virtual machine were a physical computer.

The input network interface 214 may be a virtual network interface for uploading a customer's video stream to the encoder instance 220. In embodiments, a virtual network interface is a virtualized representation of a computer network interface that may or may not correspond directly to a network interface controller of the host computing device. The virtual input network interface may be attached to and/or detached from a virtual machine instance in a VPC, such as to/from the encoder instance 220 or instances of the instance pool scaling group 222. A virtual network interface may be associated with at least one network address, such as an Internet Protocol version 4 (IPv4) or Internet Protocol version 6 (IPv6) address. In embodiments, the virtual network interface can be detached from one virtual machine instance and reattached to another virtual machine instance, and network traffic to the virtual network interface is redirected to the other virtual machine instance. The input network interface 214 may have an IP address for uploading the video stream of a customer. The IP address may be fixed for at least the duration of the upload stream.

Like the input network interface 214, the egress network interface 216 likewise may be a virtual network interface with an IP address accessible via the Internet gateway 208, but for outputting a video stream encoded by the encoder instance 220. The IP address of the egress network interface 216 may be fixed at least for the duration of the output stream.

The private subnetwork 204 may be a logical division of the data plane 202 used to isolate components of the data plane 202 such that they are not directly accessible to external entities via the Internet gateway 208. Thus, instances in the private subnetwork 204 do not have publicly accessible IP addresses. In this manner, the components of the private subnetwork 204, such as the encoder instance 220, and the instance pool scaling group 222, are less susceptible to malicious attacks from external entities.

The instance pool scaling group 222 may comprise a set of virtual machine instances provided to a customer by a computing resource service provider usable to be instantiated as an encoder instance. The instance pool scaling group 222 may be configured such that virtual machine instances and/or other computing resources are added to or removed from the set based on a setting provided by the customer and/or the computing resource service provider. For example, a computing resource configuration may indicate whether to add computing resources (e.g., virtual machine instances) to an auto-scaling group based on various factors (e.g., processor usage, memory utilization, network latency, etc.).

The software container cluster 210 may be a logical grouping of software container instances available for running tasks in customer virtual machine instances. In embodiments, the software container instances can be instantiated on demand and without network dependencies (input content excluded). The software container runtime may be reproducible using only the task definition parameters. Furthermore, if a software container instance experiences a failure, in embodiments, the failed software container image can be converted into an image for later examination. The software container cluster may be utilized by a telemetry service to allow the instance pool scaling group 222 and scalable proxy fleet 212 to be easily scaled based on resource utilization metrics.

The encoder instance 220 may may receive a media stream, such as a video stream of a live event being recorded by a customer of the computing resource service provider. The encoder instance 220 may be an instance that converts media input into a publishing stream that is transmitted to (or published to) an ingest endpoint. The publishing stream may be converted from the source format of the publishing stream into a different format for streaming the live content to a viewer. For example, the publishing stream may be converted into a transport stream format, such as a video stream file format for storing video, audio, and data information. Examples of such video stream file formats include Apple® HTTP Live Streaming (HLS) format, Microsoft® Smooth Streaming (MSS), Adobe® HTTP Dynamic Streaming (HDS), and Dynamic Adaptive Streaming over HTTP (DASH). The transport stream format may further specify a container format used to identify and interleave different data types.

FIG. 3 illustrates an example subnetworks 300 of an embodiment of the present disclosure. In some examples, a subnetwork refers to a logical subdivision of a main Internet Protocol network. Specifically, FIG. 3 depicts successful creations of subnetworks of a network 10.0.0.0/16 across five availability zones. As can be seen, each availability zone has a pair of subnetworks, "control" for management services and "public" for the encoder containers. The encoder container may have a default route through the public subnetwork for content access, security, and network metering. As can be seen in FIG. 3, the example subnetworks are specified to need 4000 IP addresses per subnetwork, and have been allocated 4094 IP addresses per subnetwork. For each subnetwork, the table lists a base IP address, the subnetwork mask in CIDR notation and dot-decimal notation, the assignable range of IP addresses for the subnetwork, and broadcast address at which each device in the subnetwork is enable to receive broadcast messages.

Figure 4:
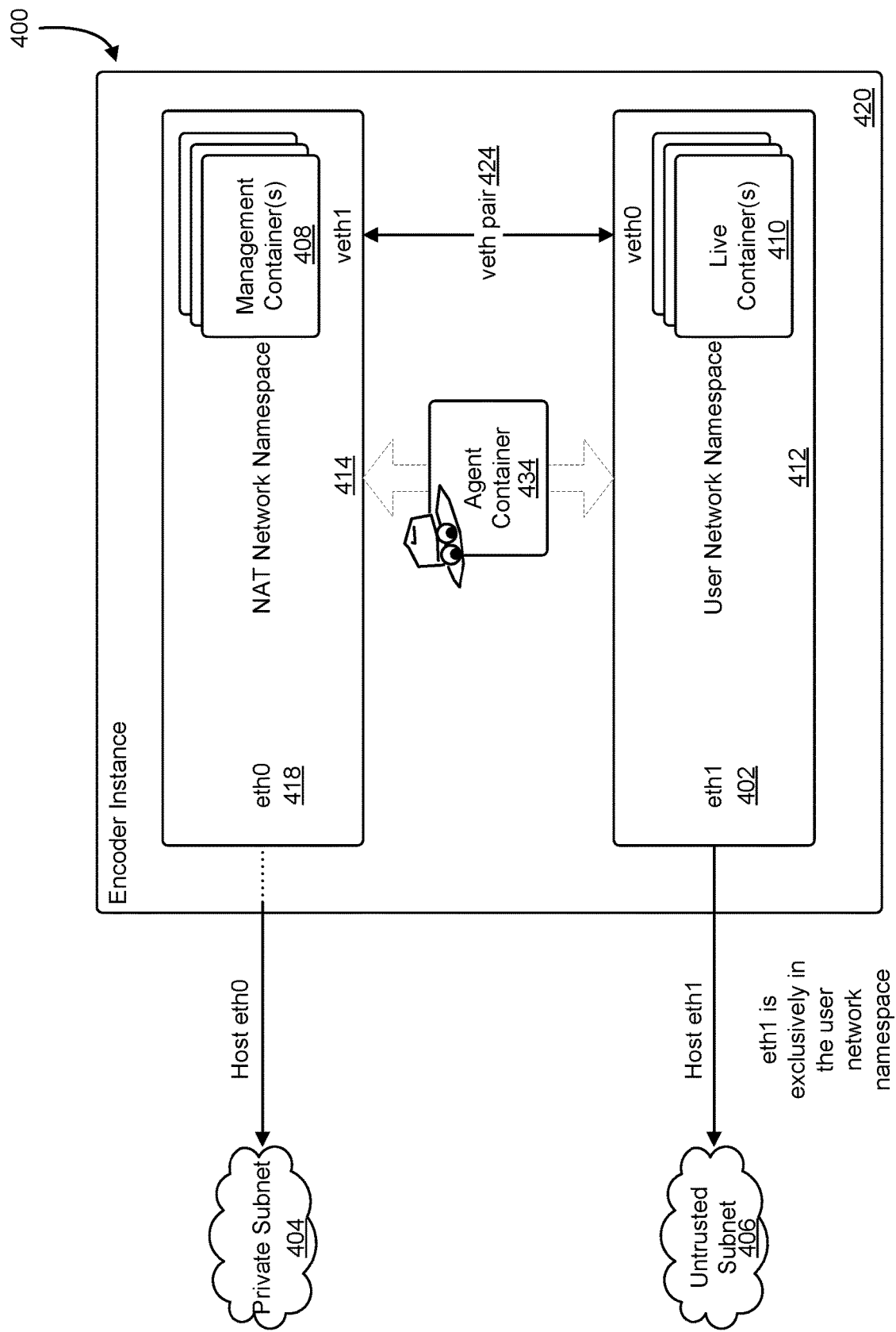
FIG. 4 illustrates an example of split network architecture in accordance with an embodiment.

FIG. 4 illustrates split networking architecture 400 of an embodiment of the present disclosure. As illustrated in FIG. 4, the split networking architecture 400 includes an encoder instance 420 that has two different network namespaces. The first namespace is a user network namespace 412 for running a set of live containers 410 that performs the actual media encoding and connected to untrusted subnetwork 406 through network interface 402 eth1. The set of live containers 410 may be assigned identifiers within the user network namespace 412. In some implementations, the identifiers may be IP addresses, whereas in other implementations the identifiers may be names such as domain names. The second namespace is a NAT network namespace 414 for running a set of management containers 408 that host management services for managing the set of live containers 401. Likewise, the set of management containers 408 may be assigned identifiers within the NAT network namespace 414. The NAT network namespace 414 may perform network address translation through a host computing device's primary network interface 418 eth0 (which may also be referred to as the management interface) to connect to private subnetwork 404.

The encoder instance 420 may be similar to the encoder instance 220 of FIG. 2 and may to run software containers. The encoder instance 420 may be running on a host computing device or may be running in a distributed fashion on multiple host computing devices. Within the encoder instance 220 may be two separate network namespaces, each running different sets of containers. The set of live containers 410 (e.g., the media encoder container) may be running in the user network namespace 412. The set of live containers 410 can communicate to the set of management containers 408 via the veth pair 424 in the user network namespace 412.

The untrusted subnetwork 406 may be a network that is not under the control of the computing resource service provider that hosts the media encoder service. In some cases, the untrusted subnetwork 406 may be a private or shared network. In some examples, the term "untrusted subnetwork" refers to a physical or logical subnetwork that is exposed to a larger, untrusted network, such as the Internet. In some implementations, the untrusted subnetwork 406 is the user's VPC or is a publicly accessible (e.g., via a network interface with a publicly available IP address) network. However, it must be noted that the customer associated with the particular encoding instance may configure restrictions such that unauthorized entities are prevented from accessing components running in the untrusted subnetwork 406.

The network interface 402 eth1 may be used for communications to the untrusted subnetwork 406. In embodiments, the network interface 402 actually comprises an eth1 as an ingress network interface and an eth2 as an egress network interface for input and output respectively. When the network interface 402 is attached to the user network namespace 412, the network interface 402 is not directly accessible by the set of management containers 408. The network interface 402 eth1 may be connected to Internet gateway routing via a virtual IP and can obtain a DHCP address from that.

The veth pair 424 may be a linked pair of virtual network interfaces that are added to both namespaces to communicatively couple (i.e., enable communication between) the two namespaces. In some examples, "couple" may refer to joining, connecting, and/or linking two or more items together. In some examples, "communicatively couple" refers to linking in a manner that facilitates communications. In embodiments, the veth pair 424 provide point-to-point communication between processes in each network. Additionally, network access control and/or firewall rule configuration may limit the connection initiation to create a unidirectional link from the management network to the encoder, thereby limiting the connection initiation capability from the set of live containers 410 to the set of management containers 408 in the NAT network namespace 414. The veth pair 424 may be used to regulate (i.e., limit) communications between software containers in the user namespace 412 and software containers and other applications in the NAT network namespace 414. That is, while the set of management containers may be allowed permissive access to the set of live containers 410 (e.g., for usage monitoring, health monitoring, etc.) through the veth pair 424, if a live container seeks to communicate with a service in the NAT network namespace 414, the live container would do so through a software container that acts as a proxy endpoint to another management container. In some implementations, the proxy endpoint is an authorization metadata service described herein.

The set of management containers 408 may be at least one software container executing computer program code for managing the set of live containers 410, as described in the present disclosure. The set of management containers 408 has access to the network interface 418. The network interface 418 may be used to communicate with management services, such as a software container management service. The set of management containers 408 additionally has access to veth1 of the veth pair 424 in the NAT network namespace for communicating with the set of live containers 410 in the user network namespace 412. Likewise, if the set of live containers 410 needs to communicate with a resource that it does not have direct access to, but the set of management containers 408 does, the set of live containers 410 can proxy over the veth0 link of the veth pair 424 through an endpoint on the veth1 IP address and the service at the end that IP address may then proxy into or talk with the appropriate resource (e.g., relational database, telemetry service, etc.). Examples of applications that could be running in the set of management containers 408 include an authorization metadata emulating service that provides end user authorization tokens to an application (e.g., an encoder) running in the set of live containers 410 for access to storage resources, applications for checking the health of applications running in the set of live containers 410, applications for obtaining utilization metrics from applications running in the set of live containers 410, and so on.

The set of live containers 410 may be at least one software container executing computer program code for performing operations such as encoding a media stream received through the network interface 402 eth1. The set of live containers 410 may have access to the network interface 402 eth1 and eth0 in the user network namespace 412. If the set of live containers 410 needs to egress to an Internet destination, the set of live containers 410 may do so via the network interface 402.

In some embodiments, the set of live containers 410 may need to access a resource (e.g., data store) that requires authentication for access. In these embodiments, credentials proxying can be used such that the set of live containers 410 obtains the appropriate credentials and/or cryptographic information needed for access to the resource from the NAT network namespace 414. For example, the customer associated with the encoder instance 420 may be associated with a particular policy management service role for accessing resources. The customer grants the media encoder service of the present disclosure the ability to assume that role on behalf of the customer. For example, the customer may have an account that includes access to a data store to which the customer wants to store the encoded video output. The customer may provide the media encoder service with the ability to store the encoded video output to the data store on behalf of the customer using the customer's credentials, token, or other manner of authentication usable to access the data store.

In some examples, a "policy management service" refers to a service of a computing resource service provider that manages access policies of customers of the computing resource service provider. In some examples, a "role" is a title associated with a set of permissions, and an entity that assumes the role inherits the set of permissions as long as the entity is associated with that role. In embodiments, an entity can be associated with one or more roles. An example of a role is a role of "administrator."

In some embodiments, the credentials proxying is enabled by an authorization metadata emulating service that resides in the NAT network namespace 414. The authorization metadata emulating service may assume the appropriate policy management service role for accessing the resource and obtain the associated cryptographic information (e.g., application programming interface keys) via the network interface 418 eth0. The authorization metadata emulating service may provide the cryptographic information to the set of live containers 410 seeking to access the resource, and the set of live containers 410 can thereby communicate directly with the resource via network interface 402 eth1.

In embodiments, the set of management containers 408 includes a software agent that periodically, randomly, or according to some other scheme, obtains metrics/measurements regarding usage information of the set of live containers 410 and provides these metrics/measurements to a telemetry service. In some examples, a "software agent" refers to a software program that, when executing, acts as an intermediary or on behalf of another entity. In some embodiments, the telemetry service is a telemetry service such as that described in U.S. patent application Ser. No. 14/951,334, entitled "CONTAINER TELEMETRY," incorporated by reference herein. The telemetry service may aggregate control group metrics (e.g., information about the state of a resource service) and container logs. Control group metrics include information such as the amount of memory used by processes running under the resource service, number of times that a process running under the resource service triggered a page fault, central processing unit (CPU) usage by processes running under the resource service, time during which the CPUs were executing system calls on behalf of processes running under the resource service, number of reads and writes to the resource service, network traffic used by the resource service on behalf of the customer, and number of input/output operations queued for the resource service. The telemetry service may allow the customers to configure the telemetry service to send an alarm to another application or service (such as an auto-scaling service) when certain control group metrics reach a value relative to a threshold.

In some embodiments, the set of management containers 408 includes a software agent that periodically, randomly, or according to some other scheme, checks the condition (e.g., "health check") of the set of live containers 410. In some examples, a "network namespace" refers to a logically separate copy of a network stack, with its own routes, firewall rules, and network devices. The user network namespace 412 may be an untrusted encoder network having access to the attached network interface 402 eth1. The user network namespace 412 may isolate the media encoder software containers from the software containers in the NAT network namespace 414 running tasks that manage the media encoder containers, such as the set of management containers 408.

The NAT network namespace 414 may be a namespace of a private subnetwork of a main network. Examples of such private subnetworks can be seen in control0, control1, control2, control3, and control4 of FIG. 3. The NAT network namespace 414 may include the network interface 418 eth0 that is network address translated (e.g., remapped) to a network interface of the host computing device hosting the media encoding service. The network interface 418 eth0 may be used for communications to the private subnetwork 404 that contains the management services. The private subnetwork 404 may be a logical division of the main encoder network, similar to the private subnetwork 204 of FIG. 2.

In some embodiments, an authorization metadata emulating service is executed within the NAT network namespace 414. The authorization metadata emulating service may intercept and redirect requests from the set of live containers 410 services within the NAT network namespace 414, such as requests to an authorization metadata emulating service. Such an authorization metadata emulating service may run in a set of management containers 408 and may provide end user authorization tokens that enables an application, such as a media encoder, running in the set of live containers 410, to authenticate to another resource or service on behalf of the customer. For example, the service or resource may be an on-demand data storage service or a block-level data storage service that stores encoded output from a media encoder.

In embodiments, the components of the encoder instance 420 run in conjunction on the host computing device as an application group and, upon failure, may failover (e.g., be re-started) on another host computing device as a group. In some examples, an "application group" refers to a set of applications that operate in a concerted fashion and have a level of trust between each other. For example, applications of an application group may exchange data between one another, whereby for proper operation of the applications the data may be trusted. In the present disclosure, the logical networks of the NAT network namespace 414 and the user network namespace 412 allow processes and services to be segregated to provide for secure ingress, egress, and monitoring of data streamed to and from the service.

The agent container 434 may be a software agent that launches the set of management containers 408 and the set of live containers 410 in the appropriate namespace. In embodiments, there is a separate agent container 434 for each child container to be launched (e.g., see FIG. 5), although it is contemplated that some implementations may utilize a master agent container 434 to launch the child containers. The agent container 434 may be passed a set of parameters, or launched with the set of containers, specifying various container options, such as which child container the agent container 434 is to launch and into which namespace the child container is to be launched. In this manner, the agent container 534 may be responsible for executing the container start commands for the child containers. In embodiments, the agent container 434 may have the privileges sufficient to set up a split networking architecture and cause virtual network interfaces to be attached as detailed in the description of FIG. 2. In embodiments, the agent container 434, during execution, determines whether the appropriate namespaces have already been created and configured (e.g., by a previous agent container) and, if not, sets up the architecture as necessary.

Figure 5:
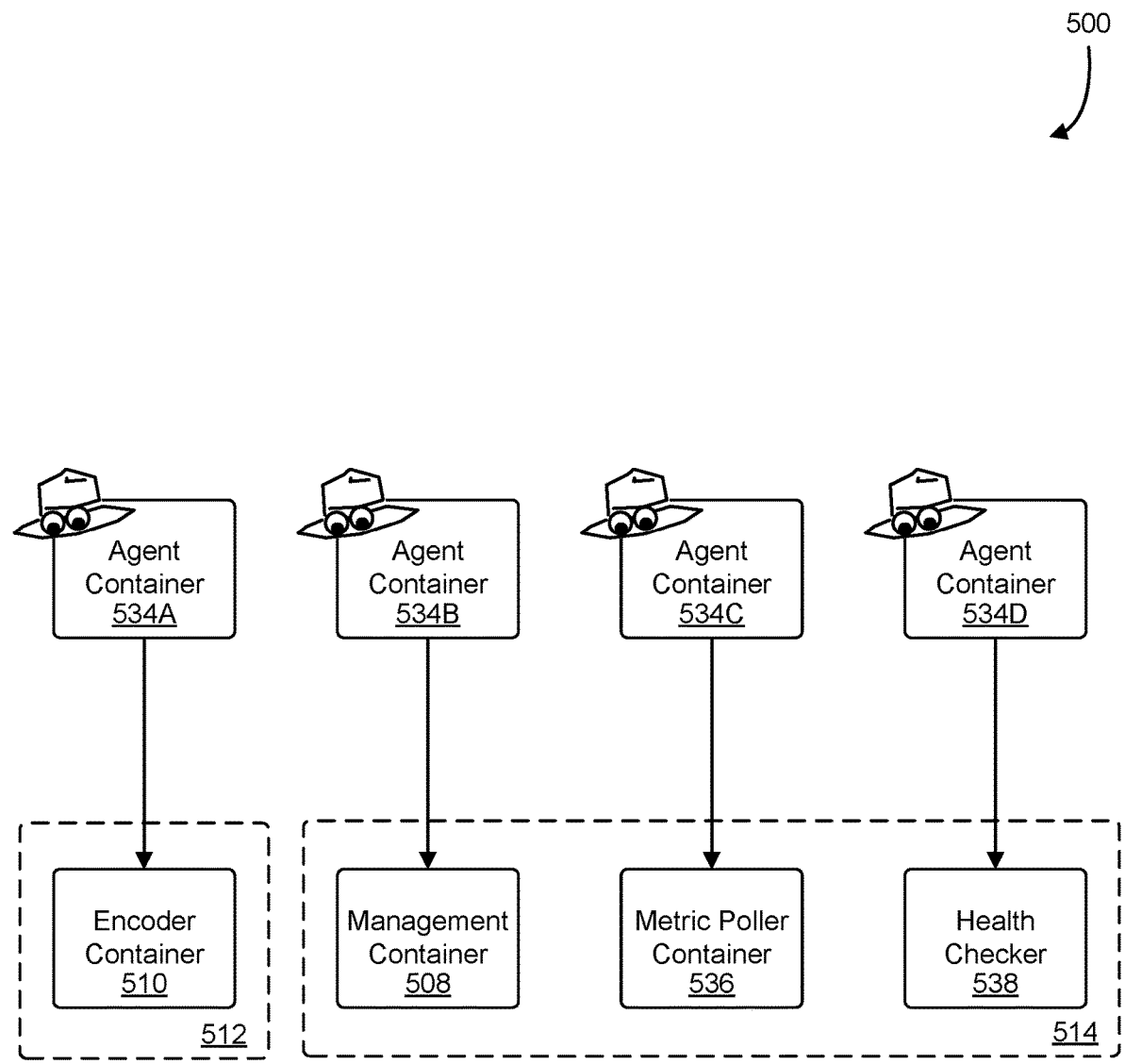
FIG. 5 illustrates an example of an agent container in accordance with an embodiment.

FIG. 5 illustrates an example 500 of an embodiment of the present disclosure. Specifically, FIG. 5 depicts an agent container for starting subcontainers of an encoder container 510, a management container 508, a metric poller container 536, and a health checker container 538 in an embodiment of the present disclosure. The agent container 534 may be a software agent running within a software container of the host computing device. The agent containers 534A-34D may be responsible for starting attaching virtual network interfaces to the host computing device on startup of one of the agent containers 534A-34D, setting up the split networking architecture illustrated in FIG. 4, moving the attached virtual network interfaces to the appropriate logical container network, and launching the subcontainers of embodiments of the present disclosure.

In embodiments, the agent container executes in a privileged mode that allows the agent container to cause the subcontainers to start. For example, the agent containers 534 may establish the various network namespace containers, such as the encoder container 510, the management container 508, the metric poller container 536, the health checker container 538, and so on, by sending the appropriate commands to the software container engine. The particular container that is to be launched by one of the agent containers 534A-34D may be specified as parameters or arguments to the particular agent container. The agent containers 534A-34D may be similar to a wrapper script and may be responsible for executing the container start commands for the subcontainers. In some examples, a "wrapper" refers to a script or application that controls the execution of other scripts or applications. The agent containers 534A-34D may include the execution logic sufficient to set up the split networking architecture and determine in which of the networking contexts (e.g., the first network namespace 514, the second network namespace 512, etc.) each of the subcontainers should reside. In some embodiments, the agent containers 534A-34D configure routing and IP tables rules to direct traffic to appropriate containers in the set of management containers.

The first network namespace 514 may be similar to the NAT network namespace 414 of FIG. 4. Likewise, the second network namespace 512 may be similar to the user network namespace 412. In some embodiments, the separated namespaces also have different policy management service constraints. For example, the first network namespace 514 may have more different and/or restrictive access policies with a policy management service than does the second network namespace 512. For example, the first network namespace 514 may have a policy role that allows virtual network interface attachment or capability to push metrics to a telemetry service, while an encoder in the set of live containers 410 may have a user role that allows access to an on-demand storage service for storage and retrieval of encoded content.

The agent containers 534A-34D may be responsible for attaching the virtual network interfaces to the host computing device. The agent containers 534A-34D, as a result of being executed, attach virtual networking interfaces to the host computing device network interfaces as necessary, launches subcontainers in their appropriate networking contexts, and attaches virtual networking interfaces as necessary to the executing software containers. The agent containers 534A-34D may also be responsible for configuring various software container engine options as specified in a task definition for the subcontainers. After the subcontainers are launched and configured, the agent containers 534A-34D may no longer be needed. In some implementations, the agent containers 534A-34D is terminated after the subcontainers are launched and configured. In other implementations, the agent containers 534A-34D is also be responsible for re-launching/restarting any subcontainers that should be re-launched/restarted (e.g., if a subcontainer experiences an error, etc.), and in such implementations, the agent containers 534A-34D remains idle until such time that a subcontainer needs to be re-launched/restarted.

In some embodiments, the agent containers 534A-34D run in a default software container engine namespace in privileged mode, which allows the agent containers 534A-34D to run privileged instructions on the host computing device. In some examples, a "privileged instruction" may refer to an instruction that can be executed only in a particular privileged mode that is generally available to an operating system but not to user programs. Examples of privileged instructions include instructions that, if executed, adjust kernel options, modify a system file or file of another user, change ownership of a file, create or remove users, mount or unmount volumes, and so on. The encoder container 510 may be similar to the video encoder 110 of FIG. 1. The management container 508 may be similar to one of the set of management containers 408 of FIG. 4. The metric poller container 536 may be a software that obtains metrics (e.g., memory usage, CPU utilization, network usage, etc.) about the encoding of streaming media, such as from the encoder container, and provide those metrics to a telemetry service.

The health checker container 538 may be a software agent that queries the health of the media encoding components, such as the encoder container 510. For example, the health checker container 538 may periodically, randomly, or according to some other scheme, receives a heartbeat signal from the encoder container 510, and, if the heartbeat signal is not received within a certain duration of time, the encoder container 510 may be assumed to have failed. Additionally or alternatively, the health checker container 538 may periodically, randomly, or according to some other scheme, poll the encoder container 510 for its health status, and if the health checker container 538 does not receive a response within a certain duration of time, the encoder container 510 may be assumed to have failed. In some examples, failure refers to a cessation of proper functioning and/or performance.

Some embodiments of the present disclosure utilize the feature of availability zone awareness. That is, in embodiments, the networking architecture of FIG. 4 is spread across multiple availability zones. In some examples, an "availability zone" (also known as a "fault isolation overlay") refers to a logical grouping of computing devices at least in part for fault tolerance purposes (e.g., computing devices in different geographic regions, computing devices grouped by power source, etc.), such as in variously located data centers.

Thus, in an implementation where two encoder instances, similar to the encoder instance 420 of FIG. 4, are started, each is started in a different availability zone. Potentially, a first encoder running in a first availability zone may output encoded video output to a first data store, and a second encoder running in a second availability zone may output encoded video output to a second data store. Thus, the implementation has dual inputs and dual outputs, with the dual outputs going to different destinations. In the implementation, there can be a separate task definition for each of the encoder instances. The task definitions for each instance may specify environment variables, which are passed down to their respective media encoder in a live container (e.g., one of the set of live containers 410 of FIG. 4), that specify the availability zone to which the task definition applies. In these implementations, upon startup, an agent container determines the particular availability zone in which the agent container is running, determines from the task definition that the configuration is specific to the particular availability zone, and overrides a default configuration or nonspecialized availability zone configuration in favor of using the configuration specified in the task definition instead. Note that although four agent containers are depicted in the example 500, it is contemplated that any number of agent containers may execute in this manner (e.g., one for each subcontainer). However, it is also contemplated that in some implementations, a single agent container rather than multiple agent containers may be responsible for launching subcontainers and configuring namespaces for a particular encoder instance.

Figure 6:
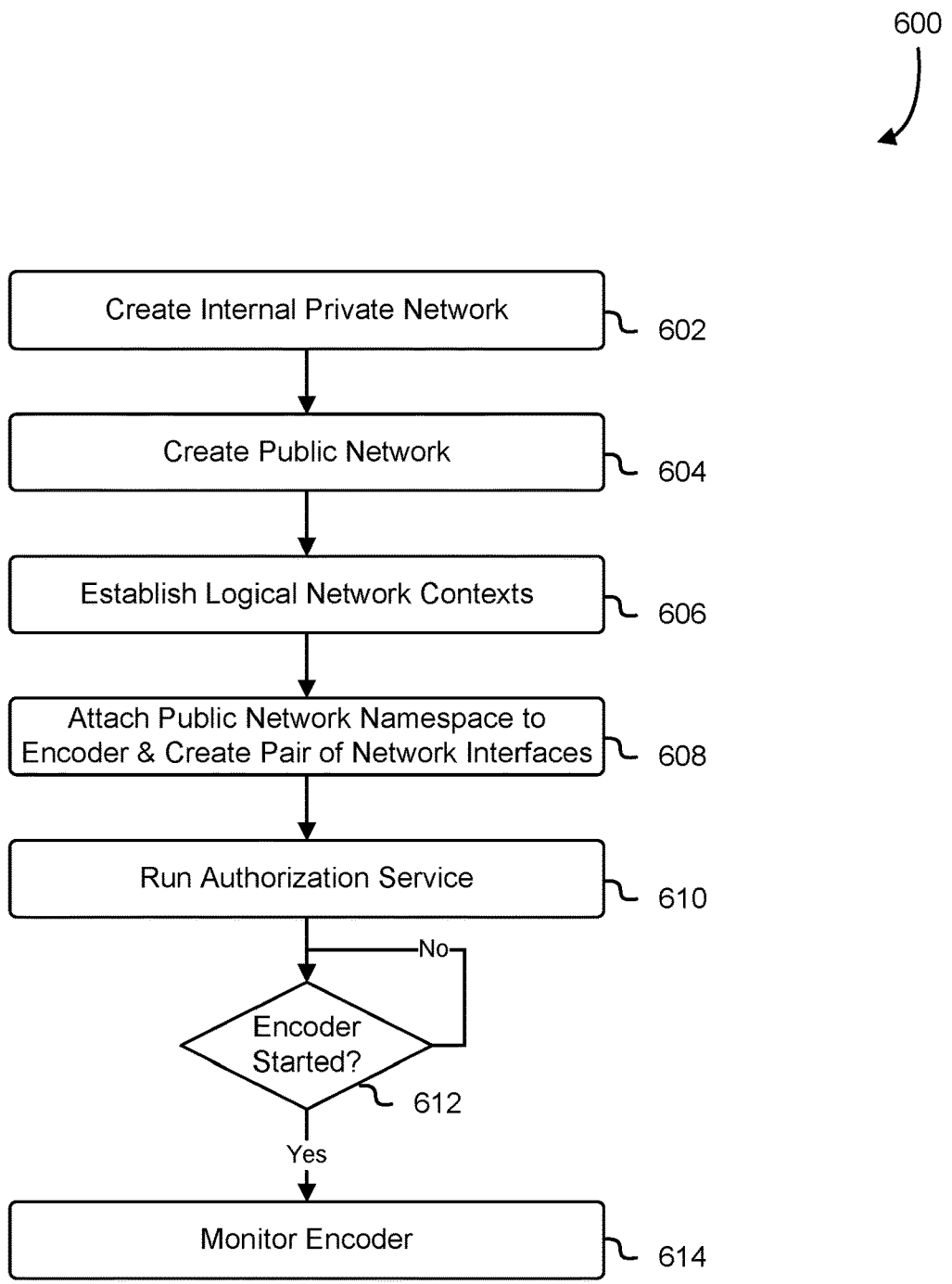
FIG. 6 is a flowchart that illustrates an example of splitting network architecture in accordance with an embodiment.

FIG. 6 is a flowchart illustrating an example of a process 600 for forming user shadow virtual private cloud subnetworks in accordance with various embodiments. Some or all of the process 600 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

Figure 8:
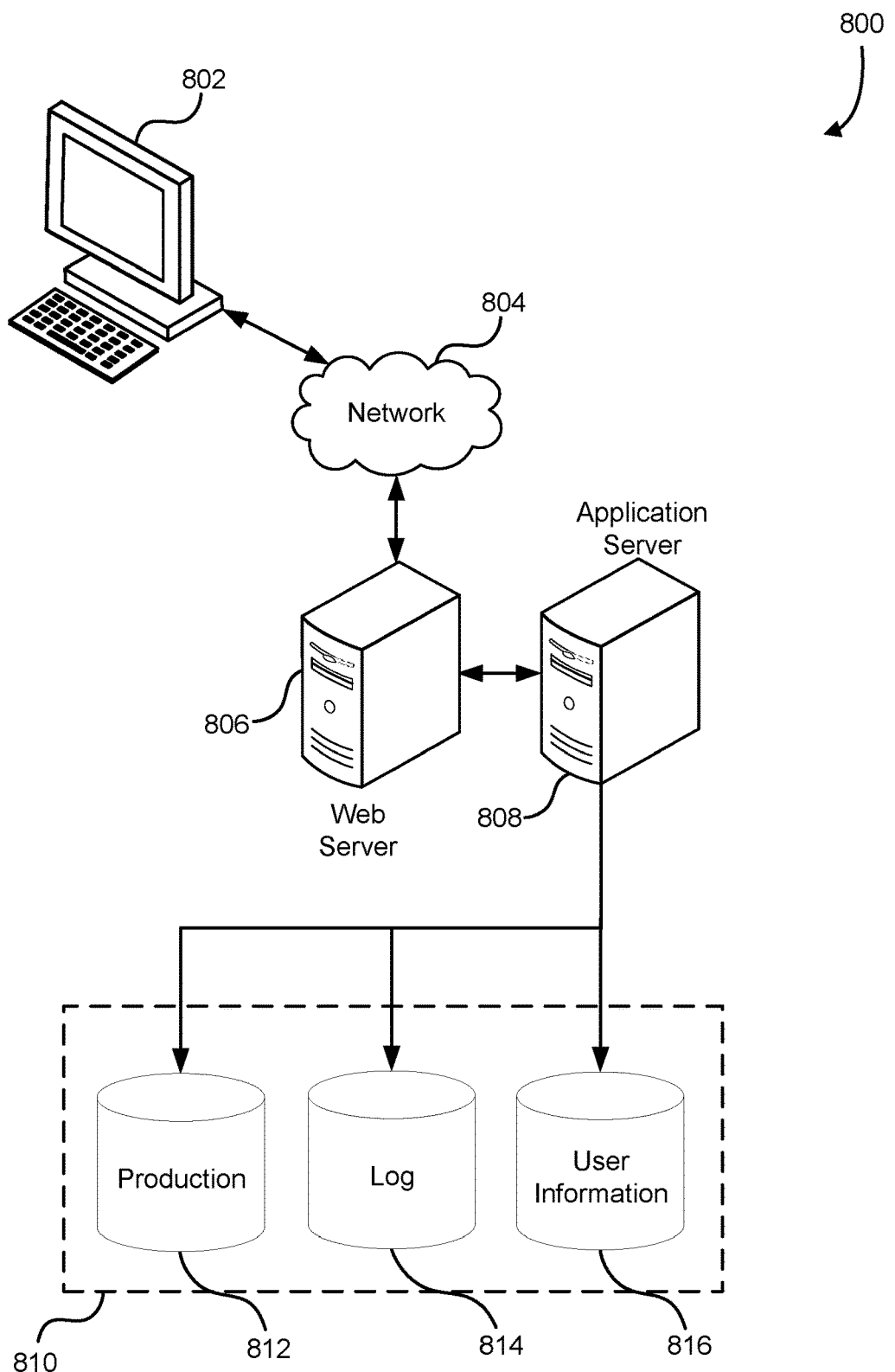
FIG. 8 illustrates an environment in which various embodiments can be implemented.

For example, some or all of process 600 may be performed by any suitable system, such as a server in a data center, by various components of the example environment 800 described in conjunction with FIG. 8, such as the web server 806 or the application server 808, by multiple computing devices in a distributed system of a computing resource service provider, or by any electronic client device such as the electronic client device 802. The process 600 includes a series of operations wherein the system creates separate logical networks, establishes logical network contexts, attaches network links between the logical network contexts, and executes an authorization metadata emulating service in a first network context to intercept and redirect communications from an encoder container running in a second network context.

In 602, the system creates a private network for the host computing system. In the user shadow virtual private cloud subnetworks 200 depicted in FIG. 2, this private network namespace is similar to the private subnetwork 204. In 604, the system creates a public encoder network with an attached network interface. In the user shadow private cloud subnetworks 200 depicted in FIG. 2, this public encoding network is similar to the public subnetwork 206.

In 606, the system establishes the logical network contexts of the public and private networks namespaces of a split networking architecture as depicted in FIG. 4. For example, the system creates the namespaces and separates the subnetworks such as in a manner similar to that illustrated in FIG. 3. In 608, the system creates a linked pair of virtual network interfaces. In the split networking architecture 400 depicted in FIG. 4, this pair of virtual network interfaces is similar to the veth pair 424. The pair of virtual network interfaces enable limited communication between the two namespaces of the private network namespace and the public encoding network namespace. In embodiments, rather than being a packet routing link, the pair of virtual network interfaces provides point-to-point communication between processes in each network.

In some embodiments, network access control or a firewall rule configuration limits the connection initiation to the private network (management network). In this manner, the connection initiation capability from the encoder to the management services in the private network is minimized or eliminated. In 610, the system launches an authorization metadata emulating service within the private NAT network to intercept encoder requests and redirects the encoder requests to services capable of fulfilling the encoder requests. In some embodiments, the authorization metadata emulating service performs a security scan on the encoder requests before redirection. In embodiments, the authorization metadata emulating service provides end-user authorization tokens to enable the encoder to have access to external storage resources requested by the user. Note that in some implementations, an authorization metadata emulating service is not implemented, and in such implementations the operations of 610 are omitted.

In 612, the system performing the process 600 determines whether the encoder is started in the public encoder network. If not, the system returns to 608 until the encoder has started. In response to the encoder starting, the system proceeds to 614. Finally, in 614, the system, having configured the host computing device for media encoding, perform ongoing monitoring of the encoder (e.g., monitoring the health of the encoder, monitoring resource usage by the encoder, etc.).

The components set up and configured in the operations of 602-14 may run together as a logical software stack on an encoder host server. In the event of a failure, the logical software stack may failover to another encoder host server as a group. The logical networks allow processes and services to be assigned to the networks as needed to securely ingress, egress, and monitor video content streamed to the media encoding service by a user. Note that one or more of the operations performed in 602-14 may be performed in various orders and combinations, including in parallel. For example, in some embodiments, the operations of 604 are performed before or in parallel with the operations of 602.

Figure 7:
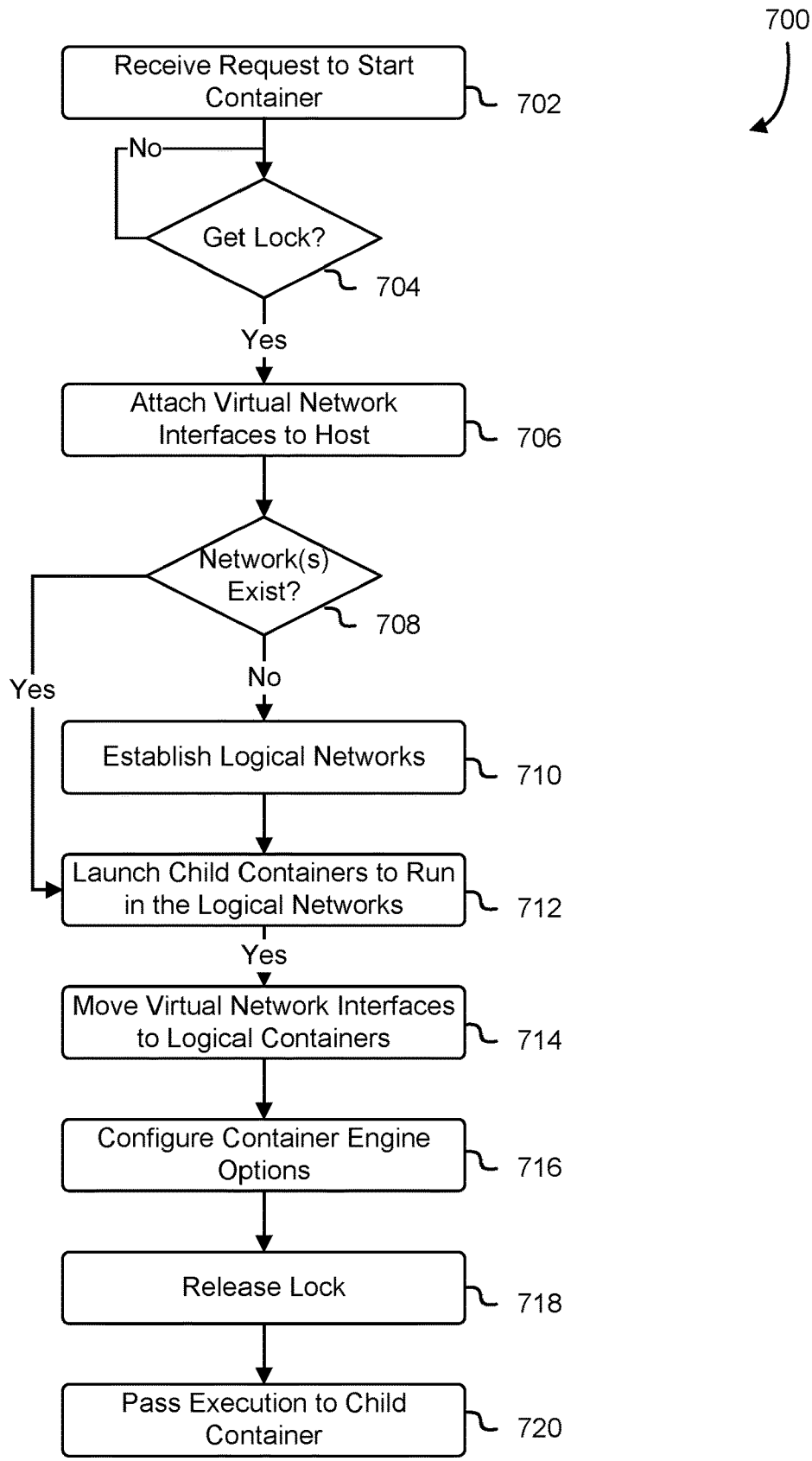
FIG. 7 is a flowchart that illustrates an example of an agent container process in accordance with an embodiment.

FIG. 7 is a flowchart illustrating an example of a process 700 performed by an agent container in accordance with various embodiments. Some or all of the process 700 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 700 may be performed by any suitable system, such as a server in a data center, by various components of the example environment 800 described in conjunction with FIG. 8, such as the web server 806 or the application server 808, by multiple computing devices in a distributed system of a computing resource service provider, or by any electronic client device such as the electronic client device 802. As noted above, the process 700 may be a set of operations of a software agent running in a software container (referred to as the agent container), such as the agent container 534 of FIG. 5, as performed by the system. The process 700 includes a series of operations wherein the agent container sets up split networks as described in the present disclosure and makes determination of which network each of the various software containers of the application group should execute. In some embodiments, the process 700 performed by the agent container is performed in an encoder instance, such as the encoder instance 420 of FIG. 4, but within a namespace separate from the namespaces in which the child containers run (e.g., the NAT network namespace 414 and the user network namespace 412 of FIG. 4).

In 702, the agent container receives a request to start a child software container in a particular network namespace. The particular child software container to start and/or the particular namespace may be specified in the request. In some implementations, the request to start a child software container is received in conjunction with a command to launch the agent container itself. As noted, in some embodiments, each agent container is assigned/associated with the particular child container it is directed to start; thus, the agent container may function as a wrapper of the child container.

In embodiments, because there may be multiple agent containers running in parallel (e.g., multiple instances of the process 700), a lock (e.g., a binary semaphore) is utilized to prevent the agent containers from interfering with each other's operations. In such embodiments, the agent container attempts to obtain/reserve the lock for itself. Hence, in 704, the agent container determines whether it was successfully able to obtain/reserve the lock. If the agent container was unable to successfully get the lock, the agent container may continue to attempt to obtain/reserve the lock and repeat the determination of 704 as needed. If the agent container successfully obtains/reserves the lock, the agent container may proceed to 706.

In 706, as noted above in the description of FIG. 5, if not already accomplished by a previous agent container, the agent container may attach virtual network interfaces to the host computing device network interfaces. In 708, the agent container determines whether the logical networks already exist in the computing instance (e.g., by a previous agent container). If the logical networks already exist the agent container proceeds to 712. Otherwise, if the logical networks do not already exist, the agent container configures virtual network interfaces, such as the network interface 418 eth0, the network interface 402 eth1, and the veth pair 424 of FIG. 4.

In 710, the agent container establishes the logical networks and namespaces, such as in the manner shown for the subnetworks of FIG. 3, and in the manner shown for the NAT network namespace 414 and the user network namespace 412 of FIG. 4. Creation of logical networks may involve various sub-processes, such as getting the Dynamic Host Configuration Protocol (DHCP) lease of the Ethernet interfaces of the logical networks, and so on.

The agent container may be privileged to execute software container commands to start the child software containers. Consequently, in 712, the agent container directs a software container manager to launch the child software container, such as one of the encoder container 510, the management container 508, the metric poller container 536, and the health checker container 538 of FIG. 5, according to the respective task definitions of the child software containers within the appropriate network namespace from the network namespaces established in 710. In embodiments, the start commands for all of the software containers in the encoder instance, other than the agent container itself, are initiated by the agent container. For example, the encoder container 510 of FIG. 5 may be launched within a user network namespace similar to the user network namespace 412 of FIG. 4, while the management container 508, the metric poller container 536, and the health checker container 538 may be launched within a NAT network namespace similar to the NAT network namespace 414. In some embodiments, the software containers to start are specified as parameters or arguments in a request or call to the agent container.

In 714, the agent container associates the virtual network interfaces with their respective logical containers. For example, after causing the encoder container 510 of FIG. 5 to start, the agent container may attach a virtual network interface to the encoder container 510 in order to enable the encoder container 510 to communicate with one or more services in a different network or as otherwise needed. In some embodiments, in 716, the agent container configures software container settings of the software container engine for optimization of the media encoding to be performed in the encoder instance. For example, the agent container may specify a limit to CPU real-time period, specify a number of CPUs, set limits on memory usage, and so on.

In 718, the agent container releases the lock obtained in 704 to allow another agent containers to get the lock. In 720, the agent container, having completed its tasks, passes execution off to the child container. In some implementations, the agent container 720 runs idle in the background and re-performs one or more of the operations of 702-20 if the agent container detects failure of a component in the encoder instance. In some implementations, the agent container ceases operating. In still other implementations, the agent container is terminated in 714, having completed its tasks. Note that one or more of the operations performed in 702-20 may be performed in various orders and combinations, including in parallel.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and convey information back to a user of the device. Examples of such client devices include personal computers, cell phones, handheld messaging devices, laptop computers, tablet computers, set-top boxes, personal data assistants, embedded computer systems, electronic book readers, and the like. The network 804 can include any appropriate network, including an intranet, the Internet, a cellular network, a local area network, a satellite network or any other network and/or combination thereof. Components used for such a system can depend at least in part upon the type of network and/or environment selected. Many protocols and components for communicating via such a network are well known and will not be discussed in detail. Communication over the network 804 can be enabled by wired or wireless connections and combinations thereof. In an embodiment, the network 804 includes the Internet and/or other publicly-addressable communications network, as the environment includes a web server 806 for receiving requests and serving content in response thereto, although for other networks an alternative device serving a similar purpose could be used as would be apparent to one of ordinary skill in the art.

The illustrative environment includes an application server 808 and a data store 810. It should be understood that there can be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, "servers" may refer to a programming module being executed on a computer system. As used, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server 808 can include any appropriate hardware, software and firmware for integrating with the data store 810 as needed to execute aspects of one or more applications for the electronic client device 802, handling some or all of the data access and business logic for an application. The application server 808 may provide access control services in cooperation with the data store 810 and is able to generate content including, text, graphics, audio, video, and/or other content usable to be provided to the user, which may be served to the user by the web server 806 in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the electronic client device 802 to provide the content in one or more forms including, forms that are perceptible to the user audibly, visually, and/or through other senses. The handling of all requests and responses, as well as the delivery of content between the electronic client device 802 and the application server 808, can be handled by the web server 806 using PUP: Hypertext Preprocessor ("PHP"), Python, Ruby, Perl, Java, HTML, XML, JSON, and/or another appropriate server-side structured language in this example. Further, operations described as being performed by a single device may, unless otherwise clear from context, be performed collectively by multiple devices, which may form a distributed and/or virtual system.

The data store 810 can include several separate data tables, databases, data documents, dynamic data storage schemes, and/or other data storage mechanisms and media for storing data relating to a particular aspect of the present disclosure. For example, the data store 810 may include mechanisms for storing production data 812 and user information 816, which can be used to serve content for the production side. The data store 810 also is shown to include a mechanism for storing log data 814, which can be used for reporting, analysis, or other purposes. It should be understood that there can be many other aspects that may need to be stored in the data store 810, such as page image information and access rights information, which can be stored in any of the above listed mechanisms as appropriate or in additional mechanisms in the data store 810. The data store 810 is operable, through logic associated therewith, to receive instructions from the application server 808 and obtain, update, or otherwise process data in response thereto. The application server 808 may provide static, dynamic, or a combination of static and dynamic data in response to the received instructions. Dynamic data, such as data used in web logs (blogs), shopping applications, news services, and other applications may be generated by server-side structured languages as described or may be provided by a content management system ("CMS") operating on, or under the control of, the application server 808. In one embodiment, a user, through a device operated by the user, can submit a search request for a certain type of item. In this embodiment, the data store 810 might access the user information 816 to verify the identity of the user and can access the catalog detail information to obtain information about items of that type. The information then can be returned to the user, such as in a results listing on a web page that the user is able to view via a browser on the electronic client device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction in FIG. 8 should be taken as being illustrative in nature and not limiting to the scope of the disclosure.

The various embodiments further can be implemented in a wide variety of operating environments, which in some embodiments can include one or more user computers, computing devices, or processing devices that can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize a network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network 804 can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java©, C, C# or C++, or any scripting language, such as Ruby, PUP, Perl, Python, or TCL, as well as combinations thereof. The server(s) may also include database servers, including those commercially available from Oracle©, Microsoft©, Sybase*, and IBM© as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network 804. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen, or keypad), and an output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," and "the" and similar referents in the context of describing the disclosed embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some embodiments, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some embodiments, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some embodiments, be single devices and, in other embodiments, be distributed computer systems comprising multiple devices that operate differently such that the distributed computer system performs the operations described and such that a single device may not perform all operations.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A system, comprising:
   one or more processors; and
   memory including executable instructions that, as a result of execution by the one or more processors, cause the system to operate:
   a first network comprising a first namespace in a computing instance, wherein the first namespace is isolated from entities external to the computing instance;
   an agent software container that:
      reserves a lock to:
         prevent interference by the agent software container with operations of one or more other agent software containers, and
         prevent other agent software containers from interfering with the agent software container, and
      launches a first software container in the first namespace in isolation from the entities external to the computing instance,
      wherein the first software container executes a first service;
   a second network comprising a second namespace different from the first namespace, the second namespace including an identifier associated with a second software container that executes a second service, with the second software container being connected to at least one of the entities external to the computing instance via a network interface inaccessible to the first software container, the identifier associated with the second software container being a network address assigned to a virtual network interface; and
   a pair of virtual network interfaces that communicatively couple the first network to the second network, wherein the pair of virtual network interfaces limits access to the first network from the second network.

2. The system of claim 1, wherein the agent software container launches the first software container in accordance with a parameter in the system that directs the agent software container to start one or more software containers.

3. The system of claim 1, wherein the agent software container configures software settings of the first software container for optimization of a service performed in the system.

4. The system of claim 1, wherein the agent software container directs a software container manager to launch the second software container.

5. A computer-implemented method performed by an agent container, comprising:
receiving a request to start a child container in a first namespace, the first namespace being connected to entities external to a host computing device via a virtual network interface that is inaccessible to a different child container; and
establishing network architecture to sandbox the child container by at least:
attaching the virtual network interface to the host computing device network interface;
determining whether a logical network separating the first namespace from a second namespace exists in a host computing device;
as a result of a determination that the logical network separating the first namespace from the second namespace does not exist, establishing the logical network in the host computing device;
launching the child container in the first namespace; and
attaching the virtual network interface to the child container,
wherein the child container communicates with the entities external to the host computing device via the virtual network interface and wherein the second namespace comprises an identifier associated with the child container, the identifier being a network address dynamically attached to the child container, and
wherein prior to establishing the network architecture, determining that the agent container has obtained a reservation for a lock, the lock:
preventing other agent containers from interfering with the agent container, and
preventing interference of the agent container with operations of one or more other agent containers.

6. The computer-implemented method of claim 5, wherein the request includes a parameter specifying a child container to launch and a namespace into which the child container is to be launched.

7. The computer-implemented method of claim 5, further comprising:
prior to establishing the network architecture, determining that the agent container has obtained the lock preventing the other agent containers from interfering with the agent container; and
after establishing the network architecture, releasing the lock, allowing another agent software container to utilize the lock.

8. The computer-implemented method of claim 5, wherein the child container is a media encoder that, when executed:
receives, via at least a network interface, a media stream in a first format; and
transforms the media stream into a transformed media stream comprising a second format.

9. The computer-implemented method of claim 5, wherein establishing the logical network comprises obtaining a network management protocol lease of Ethernet interfaces of the logical network.

10. The computer-implemented method of claim 5, wherein the agent container directs a container manager to launch the child container.

11. The computer-implemented method of claim 5, wherein the agent container is authorized to execute privileged instructions on the host computing device.

12. The computer-implemented method of claim 5, further comprising:
transferring execution of container commands to the child container; and
terminating the agent container.

13. A non-transitory computer-readable storage medium storing executable instructions that, as a result of being executed by one or more processors of a computer system, cause the computer system to at least:
receive, at an agent container, a request to start a first software container that executes a first service in a first namespace, the first namespace connecting to entities external to a host device that includes the first namespace via a network interface that is inaccessible to a second software container;
obtain a reservation for a lock that prevents other agent containers from interfering with the agent container;
obtain a lock that prevents the other agent containers from interfering with the agent container and that prevents interference of the agent container with operations of the other agent containers;
attach the network interface to a host device network interface;
in response to a determination that a logical network does not exist in a host device, establish the logical network in the host device, the logical network separating the first namespace from a second namespace that identifies the first software container, the second namespace comprising a network address associated with the first service;
launch the first software container in the first namespace;
attach the network interface to the first software container, wherein the first software container communicates with entities external to a host device via the network interface; and
release the lock to allow a different agent container to utilize the lock.

14. The non-transitory computer-readable storage medium of claim 13, wherein the first software container includes a media encoder.

15. The non-transitory computer-readable storage medium of claim 13, wherein the agent container operates as a wrapper to the first software container.

16. The non-transitory computer-readable storage medium of claim 13, wherein the request includes a parameter directing the agent container to start one or more software containers.

17. The non-transitory computer-readable storage medium of claim 13, wherein the agent container monitors a health status of the first software container in the first namespace.

18. The non-transitory computer-readable storage medium of claim 13, wherein the agent container directs a software container manager to launch the first software container.

19. The non-transitory computer-readable storage medium of claim 13, wherein:
the executable instructions include instructions that cause the computer system to further allow the agent container to pass execution of software container commands off to the agent container; and the agent container resumes execution of the software container commands at least if the agent container detects a failure of a component in the host device.

20. The non-transitory computer-readable storage medium of claim 13, wherein the request to start the first software container is received in conjunction with a command to launch the agent container.

\* \* \* \* \*